United States Patent
Knas et al.

(10) Patent No.: US 11,598,644 B1
(45) Date of Patent: Mar. 7, 2023

(54) WEARABLE ELECTRONIC NAVIGATION SYSTEM

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 157 days.

(21) Appl. No.: 17/107,525

(22) Filed: Nov. 30, 2020

Related U.S. Application Data

(63) Continuation of application No. 16/169,867, filed on Oct. 24, 2018, now Pat. No. 10,852,154.

(51) Int. Cl.
*G01C 21/36* (2006.01)
*G06F 3/14* (2006.01)

(52) U.S. Cl.
CPC ....... *G01C 21/3661* (2013.01); *G06F 3/1438* (2013.01)

(58) Field of Classification Search
CPC .......................... G01C 21/3661; G01C 21/206
See application file for complete search history.

(56) References Cited

U.S. PATENT DOCUMENTS

| | | | |
|---|---|---|---|
| 6,496,116 B2 | 12/2002 | Farringdon et al. | |
| 9,779,605 B1 * | 10/2017 | Taylor | G01S 13/93 |
| 2006/0290519 A1 | 12/2006 | Boate et al. | |
| 2015/0097683 A1 | 4/2015 | Sloo et al. | |
| 2015/0196101 A1 * | 7/2015 | Dayal | G01C 21/3602 63/1.11 |
| 2015/0330787 A1 | 11/2015 | Cioffi et al. | |
| 2017/0289749 A1 | 10/2017 | Brennan et al. | |
| 2018/0079429 A1 * | 3/2018 | Prokhorov | H04B 1/3822 |
| 2018/0185232 A1 | 7/2018 | Namdar et al. | |

OTHER PUBLICATIONS

Amutha et al.; Development of A Zigbee Based Virtual Eye for Visually Impaired Persons; 2014 Intl. Conf. on Indoor Positioning and Indoor Navigation; Oct. 27-20, 2014; pp. 564-574 (Year: 2014).*

Ramadhan; Wearable Smart System for Visually Impaired People; Sensors (Basel),; Mar. 13, 2018; 18(3):843 doi:10.3390/s18030843, PMID: 29533970; PMCID: PMC5877379 (Year: 2018).*

Kumar et al.; Smart-cap for Pedestrian Safety; 2015 Intl. Conf. on Control, Instrumentation, Communication and Computational Technologies (ICCICCT); pp. 583-587 (Year: 2015).*

(Continued)

*Primary Examiner* — Michael J Zanelli
(74) *Attorney, Agent, or Firm* — Foley & Lardner LLP

(57) ABSTRACT

The methods and systems disclosed herein provide a server that periodically monitors a user's location using one or more beacons while periodically monitoring hazardous conditions using a variety of electronic sensors, such as thermographic imaging. When the user is within a predetermined proximity of a hazardous condition the server transmits an instruction to an electronic wearable device to present a notification (e.g., haptic, noise, and the like) warning the user of the hazardous condition.

18 Claims, 7 Drawing Sheets

(56) References Cited

OTHER PUBLICATIONS

Silva et al.; State-of-Art-in-Indoor Navigation and Positioning of Visually Impaired and Blind; 2017 Intl. Conf. on Advances in ICT for Emerging Regions (ICTer); pp. 271-279 (Year: 2017).*

Dakopoulos et al.; Wearable Obstacle Avoidance Electronic Travel Aids for Blind: A Survey; IEEE Trans. on Systems, Man, and Cybernetics—Part C: Applications and Reviews, vol. 40, No. 1; Jan. 2010; pp. 25-35 (Year: 2010).*

Khampachua et al.; Wrist-mounted Smartphone-based Navigation Device for Visually Impaired People Using Ultrasonic Sensing; 2016 Fifth ICT Intl. Student Project Conf. (ICT-ISPC) (Year: 2016).*

\* cited by examiner

WEARABLE ELECTRONIC NAVIGATION SYSTEM

CROSS REFERENCE TO RELATED APPLICATIONS

This application is a continuation application of U.S. patent application Ser. No. 16/169,867, filed Oct. 24, 2018, which is incorporated herein by reference in its entirety.

TECHNICAL FIELD

This application relates generally to location identification and navigating users via electronic wearable navigation devices.

BACKGROUND

As location and movement-tracking technology allows for more efficient tracking and monitoring user locations, more people rely on technologies for indoor and outdoor navigation. However, several technological shortcomings have also been identified and have created a new set of challenges. Existing and conventional navigation systems do not provide an accurate identification of obstacles and hazardous areas. Conventional indoor and/or outdoor navigation systems use a retroactive methodology where a navigation device identifies an obstacle after the navigation device (or the user operating the navigation device) has made contact with the obstacle. For instance self-driven robotic devices, such as robotic vacuum cleaners or other household items, identify obstacles after detecting an impact with the obstacle. Subsequently, the self-driven robotic devices change course to avoid another impact. As expected, these navigation systems may not be suitable for human users with disabilities, such as visually impaired users.

SUMMARY

For the aforementioned reasons, there is a need for an accurate system and navigation method, which would proactively and accurately identify obstacles and hazardous areas and proactively warn users to avoid contact with the identified obstacles and hazardous.

Disclosed herein are systems and methods for utilizing multiple electronic sensors (e.g., beacons, accelerometers, infrared thermal imaging cameras, sonar cameras, gyroscope, compass, ambient light sensor, altimeter, and the like) to identify a user's location and direction, velocity, and acceleration of movements. The disclosed systems and methods also utilize multiple electronic sensors (e.g., thermal imaging cameras, infrared cameras, and ultrasonic cameras) to identify any obstacles or hazardous areas/materials. Furthermore, the disclosed systems and methods may proactively determine whether a user is within a predetermined proximity to a hazardous area/material and may proactively notify/warn the user utilizing an electronic navigation device, which, in some environments, can be a wearable device. The warning notification may be auditory, visually, haptic, and the like.

In an embodiment, a method comprises periodically monitoring, by a server, location of a wearable electronic user device by periodically receiving, via the wearable electronic user device, at least one unique identifier associated with one or more beacons; periodically receiving, by the server, obstacle data from one or more electronic sensors, the obstacle data corresponding to an image of one or more obstacles within a first predetermined proximity to the location of the wearable electronic user device monitored via the one or more beacons; upon determining an obstacle within a second predetermined proximity to the location of the wearable electronic user device monitored via the one or more beacons: generating, by the server, an instruction to present a warning notification, wherein the warning notification corresponds to a proximity value between the location of the wearable electronic user device and the obstacle; and transmitting, by the server, the instruction to the wearable electronic user device, whereby upon receiving the instruction, wearable electronic user device presents the warning notification.

In another embodiment, a computer system comprises one or more beacons configured to transmit unique identifiers; one or more electronic sensors configured to capture and transmit image data; a wearable electronic user device configured to receive unique identifiers from the one or more beacons and further configured to present a warning notification; and a server in communication with the one or more beacons and the one or more electronic sensors, the server configured to: periodically monitor location of the wearable electronic user device by periodically receiving, via the wearable electronic user device, at least one unique identifier associated with one or more beacons; periodically receive obstacle data from one or more electronic sensors, the obstacle data corresponding to an image of one or more obstacles within a first predetermined proximity to the location of the wearable electronic user device monitored via the one or more beacons; upon determining an obstacle within a second predetermined proximity to the location of the wearable electronic user device monitored via the one or more beacons: generate an instruction to present a warning notification, wherein the warning notification corresponds to a proximity value between the location of the wearable electronic user device and the obstacle; and transmit the instruction to the wearable electronic user device, whereby upon receiving the instruction, wearable electronic user device presents the warning notification.

In another embodiment, a method comprises periodically monitoring, by a server, location of a wearable electronic user device by periodically receiving, via the wearable electronic user device, at least one unique identifier associated with one or more beacons; upon determining the location of the wearable electronic user device, retrieving, by the server, a hazard within a proximity of the location of the wearable electronic user device where the server identifies at least one beacon associated with the hazard; upon receiving, via the wearable electronic user device, a unique identifier of at least one beacon associated with the hazard and upon determining that the location of the wearable electronic user device is within a predetermined proximity to the hazard: generating, by the server, an instruction to present a warning notification, wherein the warning notification corresponds to a proximity value between the location of the wearable electronic user device and the hazard; and transmitting, by the server, the instruction to the wearable electronic user device, whereby upon receiving the instruction, wearable electronic user device presents the warning notification.

In another embodiment, a computer-implemented method comprises periodically monitoring, by a server, location of an electronic user device by periodically receiving, via the electronic user device, at least one unique identifier associated with one or more beacons; retrieving, by the server, a location of a hazard associated with the identified location of the electronic user device; periodically monitoring, by the server, location of an obstacle by periodically receiving, via one or more electronic sensors associated with the identified location of the electronic device, navigation data; upon determining that a location of the electronic user device is within a predetermined proximity to the location of the obstacle or the location of the hazard: generating, by the server, an instruction to present a warning notification, wherein the notification corresponds to a proximity value between the location of the user device and the location of the hazard or the location of the obstacle; transmitting, by the server, the instruction to the electronic user device, whereby upon receiving the instruction, electronic user device presents the notification.

In another embodiment, a computer system comprises one or more beacons configured to transmit unique identifiers; one or more electronic sensors configured to capture and transmit navigation data; an electronic user device configured to receive unique identifiers from the one or more beacons and further configured to present a warning notification; and a server in communication with the one or more beacons and the one or more electronic sensors, the server configured to periodically monitor location of the electronic user device by periodically receiving, via the electronic user device, at least one unique identifier associated with the one or more beacons; retrieve a location of a hazard associated with the location of the electronic user device; periodically monitor location of an obstacle by periodically receiving, via one or more electronic sensors associated with the location of the electronic user device, navigation data; upon determining that a location of the electronic user device is within a predetermined proximity to the location of the obstacle or the location of the hazard: generate an instruction to present a warning notification, wherein the warning notification corresponds to a proximity value between the location of the user electronic device and the location of the hazard or the location of the obstacle; and transmit the instruction to the electronic user device, whereby upon receiving the instruction, electronic user device presents the warning notification.

In another embodiment, a computer method comprises periodically monitoring, by a server, location of a user mobile device by periodically receiving, via an application executing on the user mobile device, at least one unique identifier associated with one or more beacons; retrieving, by the server, a location of a hazard associated with the identified location of the user mobile device; periodically monitoring, by the server, location of an obstacle by periodically receiving, via one or more electronic sensors associated with the identified location of the user mobile device, navigation data; upon determining that a location of the user mobile device is within a predetermined proximity to the location of the obstacle or the location of the hazard: generating, by the server, an instruction to present a warning notification, wherein the notification corresponds to a proximity value between the location of the user mobile device and the location of the hazard or the location of the obstacle; transmitting, by the server, the instruction to a wearable electronic device associated with the user, whereby upon receiving the instruction, wearable electronic device presents the notification.

It is to be understood that both the foregoing general description and the following detailed description are exemplary and explanatory and are intended to provide further explanation of the disclosed systems and methods for providing beacon-based navigation system.

BRIEF DESCRIPTION OF THE DRAWINGS

The foregoing summary, as well as the following detailed description, is better understood when read in conjunction with the appended drawings. For illustrating the claimed subject matter, the drawings show example constructions of various embodiments. However, the claimed subject matter is not limited to the specific methods and instrumentalities disclosed.

DETAILED DESCRIPTION

The subject matter of the described embodiments is described with specificity to meet statutory requirements. However, the description itself is not intended to limit the scope of this patent. Rather, the inventors have contemplated that the subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
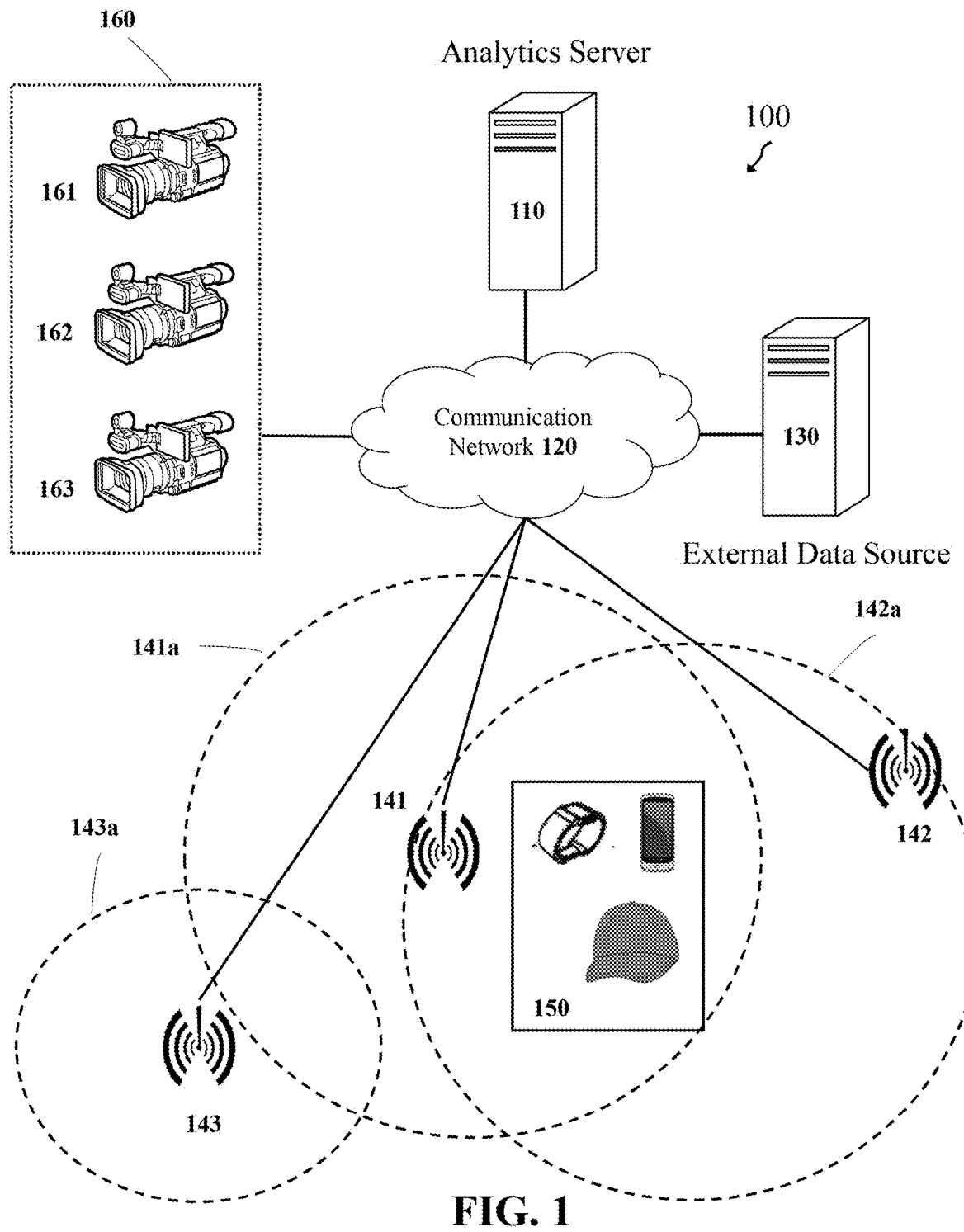
FIG. 1 illustrates an example of a computer environment for providing a navigation system having an electronic wearable navigation device, according to an embodiment.

FIG. 1 illustrates components of a navigation system 100 having an electronic wearable navigation device, according to an embodiment. In at least one configuration, the navigation system 100 comprises an analytics server 110, a communication network 120, an external data source 130, beacon 141, beacon 142, beacon 143 (collectively "beacons 140"), smart camera 161, thermographic camera 162, and ultra-sonic camera 163 (collectively "electronic sensors 160"), and an electronic navigation device. The analytics server 110 may communicate with the beacons 140, electronic sensors 160, the electronic notification device 150, and the external data source 130 using the communication network 120, such as the Internet, secure network, or a cloud-based communication.

The analytics server 110 may perform various analytics on data records received from the beacons 140, electronic sensors 160, and/or external data source 130 and may generate and transmit instructions to the electronic notification device 150 to present warning notifications. The analytics server 110 may be any computing device comprising a processor capable of performing the various tasks and processes described herein. Non-limiting examples of the analytics server 110 may include a server, desktop, laptop, tablet, and the like. The analytics server 110 comprises any number of computer-networking components, which facilitate inter-device communications via the communication network 120. There may be any number of distinct computing devices functioning as the analytics server 110 in a distributed computing environment.

The analytics server 110 may communicate data records and instructions to any of the computing devices illustrated in FIG. 1. The analytics server 110 may also transmit data records to an internal or external database (not shown in FIG. 1) where the data records may be stored in the database (or a cloud storage system) and where various analytics may be performed on the stored data in accordance with instructions from the analytics server 110. For instance, all location data, obstacle data, geo-fencing data, notification data, user preferences, and any other data received in conjunction with providing the navigation system 100 may be stored in the database and analyzed to provide better and more accurate navigation services to the user. The analytics server 110 may also host an online service, such as cloud-computing application service, a website, or any other service that provides customer-facing web-based applications that collect customer data through web-based interactions. For instance, a user may provide user preferences (e.g., notification preferences) and/or navigation data (e.g., an existing floor map of a location, such as the user's dwelling, as shown in FIG. 3).

The beacons 140 may be hardware transmitters and communication devices, which communicate with other electronic devices, such as the electronic notification device 150. The beacons 140, in some embodiments, may utilize Bluetooth low energy (BLE) transmission technology to communicate with electronic devices within a pre-determined proximity zone, such as the proximity zones 141a, 142a, and 143a. The beacons 140 may broadcast an identifier to nearby portable electronic devices located within the proximity zones 141a, 142a, and 143a, such as the electronic notification device 150. In an embodiment, proximity zones 141a, 142a, and 143a represent the range of transmission of identifier by each beacon within the beacons 140. For example, the beacons 140 may be instructed (by the analytics server 110) to transmit identifier within a radius of 10 feet. Additionally or alternatively, some smartphones can act as beacons.

In some embodiments, the beacons 140 may transmit a Universally Unique Identifier (UUID) as an identifier. A UUID is a 128-bit value identifier used in software construction. The analytics server 110, may then, transmit said UUID and query an internal or external database (or another third-party database associated with the use or a location of the beacons 140) for any information associated with said UUID, such as location of the beacon. The frequency of sending the signal can also be programmable. For example, a signal can be sent every 100-400 milliseconds. Beacons 140 can also be placed strategically indoors or outdoors to perform many actions.

As used herein, the term "Beacon" applies to any device, mobile or fixed, that is capable of transmitting a data packet. A data packet can be the same as defined in the Bluetooth specification or any other data packet that transmits a unique identifier. Beacons 140 may (repeatedly, continuously, or periodically) transmit data packets in set (or adjustable) intervals.

In a non-limiting example, the iBeacon system disclosed herein may utilize iBeacons (a form of beacon) to transmit a data packet consisting mainly of three pieces of information—a Universally Unique Identifier (UUID), a major field, and a minor field. In addition, an iBeacon typically transmits that data packet repeatedly. Further information about beacons can be found in the Supplement to the Bluetooth Core Specification, Version 5, which is incorporated by reference herein. In one embodiment, different institutions (e.g., retailers) use these beacons or transmitters as a hyper-local device tracking mechanism (e.g., to locate smartphones within the proximity zone). Non-limiting examples of transmitters include an iBeacon, AltBeacon, and EddyStone, a wireless router, a cellular phone, a tablet, a workstation, or any other suitable computing or other electronic device. The UUID portion of the data packet may be associated with the institution while the major and minor field may identify specific zone (e.g., geo-fence) within a particular area. As described below, the analytics server 110 may be in direct connection with the user' electronic notification device 150 through an application installed and executing on the user's mobile device.

Additional information can be gleaned from BLE signals, including an approximate distance between the beacon 140 and the electronic notification device 150. Furthermore, beacon 140 can be programmed to broadcast its signals at different power levels, known as the "Broadcasting Power." For example, the beacons 140 can transmit its Broadcasting Power to the receiving device, which can approximate its distance from the beacon by comparing the Broadcasting Power to the strength of the signal as received, known as the Received Signal Strength Indicator (RSSI). As depicted FIG. 1, in some configurations, the analytics server 110 may utilize multiple beacons within a predetermined area where each beacon is associated with different RSSI and UUID data packets.

In some embodiments, a receiving device or an electronic notification device (e.g., a smartphone or any other device configured to communicate with a beacon) can also transmit a data packet, acting as a beacon, which can be received by another receiving device, fixed or mobile. In either case, fixed or mobile, this reception serves to notify the receiver that the mobile transmitter is nearby. As an example, a mobile application can instruct an electronic notification device to transmit a data packet associated with a network identity, which upon reception at another device, fixed or mobile, can indicate proximity of a user to the network. For example, receiving devices can be placed throughout a building. These receiving devices would monitor the receiving devices' location to track the user. The system of this embodiment can then store the information of which transmitters the user went past, and the user can use an application to retrieve this information. In this way, the system described in FIG. 1 may not need permanently installed beacons to constantly transmit data packets; and depending on the number of transmitters needed, there can be significant cost/complexity savings using this method.

In some embodiments, analytics server 110 can use RSSI or triangulation to assess, more accurately, the location of electronic notification device 150. For instance, the electronic notification device 150 may receive signals from more than one source or of more than one type, e.g., Wi-Fi, BLE, and GPS. By relying on more than once source, these embodiments are more reliable and more accurate. Even though the embodiments disclosed herein describe using beacon technology, it is expressly understood that the location of a user may be determined using any other technology such as Wi-Fi, BLE, and/or GPS. The embodiments disclosed herein are not limited to beacon technology.

In operation, the beacons 140 may be placed in specific areas of indoor space, such as conference rooms, hallways, kitchens, offices, and other areas in a workspace. As described above, the analytics server 110 may utilize more than one beacon; in those embodiments, each beacon can be configured such that the location signal range encompasses approximately the boundaries of the area (e.g., geo-fenced area). For example, as depicted in FIG. 1, the electronic notification device 150 is within the range of beacon 142 and beacon 141 (i.e., 141a and 142a). Therefore, the electronic notification device 150 may transmit UUIDs corresponding to beacon 141 and UUID corresponding to beacon 142 to the analytics server 110. The analytics server 110 may gauge the strength of the UUIDs received from each beacon and may triangulate and identify an exact location of the electronic notification device 150 based on a strength of UUID transmittal received from each beacon.

The electronic sensors 160 may refer to multiple cameras or other electronic sensors installed within a predetermined location (or sometimes embedded within electronic notification device 150) to provide more accurate navigation information to the user. The electronic sensors 160 may include smart camera 161, thermographic camera 162, and ultrasonic camera 163. In some configurations the navigation system 100 (more particularly, the analytics server 110) may use one or more of the electronic sensors 160 to determine hazardous areas and/or obstacles. For instance, when the user requests the analytics server 110 to provide navigation services within the user's dwelling, the analytics server 110 may identify one or more electronic sensors installed within the user's dwelling, activate said sensors, receive data from each sensor, and monitor for obstacles, hazardous areas, or moving objects.

The smart camera 161 may be an intelligent camera equipped with machine vision system, which, in addition to image capture circuitry, may be capable of extracting application-specific information from the captured images, along with generating event-specific descriptions. In some configurations, the smart camera 161 may be self-contained, stand-alone vision system with a built-in image sensor. For instance, the smart camera 161 may transmit media elements (e.g., images and/or videos) along with insights (e.g., recognition of items, item locations, and/or an estimated distance to the) to the analytics server 110. In some configurations, the smart camera 161 may transmit the media elements to the analytics server 110 whereby the analytics server 110 analyzes the media elements received in order to recognize objects or generate other insights. For instance, the smart camera 161 may periodically capture images of the user's dwelling and identify various objects (e.g., stove, furniture, and the like) and send in machine-readable file in a format compatible to be analyzed by the analytics server 110.

The thermographic camera 162 may be a device that forms an image using infrared radiation. In some configurations, instead of the 400-700 nm range of visible light camera, the thermographic camera 162 may operate in wavelengths as long as 14,000 nm. Infrared energy is a part of the electromagnetic spectrum, which encompasses radiation from gamma rays, x-rays, ultraviolet, thin region of visible light, infrared, tarahertz waves, microwaves, and radio waves. All objects commit a certain amount of blackbody radiation as a function of their temperatures. For instance, the higher an object temperature, the more infrared radiation is presented as black—body radiation. The thermographic camera 162 can detect this radiation in a way similar to the way an ordinary camera detects visible light. The thermographic camera 162 can work in total darkness and without the need for light emission. Simply put, the thermographic camera 162 provides thermographic data, e.g., a heat map to the analytics server 110. For instance, the thermographic camera 162 may indicate existence of a warm body, or a warm stove near a user who is visually impaired. Upon analyzing the thermographic data received from the thermographic camera 162, the analytics server 110 may identify movement of warm bodies, such as pets or other inhabitants of a dwelling.

The ultrasonic camera 163 may be a form of ultrasonic transducer that admits ultrasonic wave (e.g., sound at a frequency higher than the human ear can hear) and receives reflections from the nearby objects. When the ultrasonic camera 163 detects a change in the reflection received, the ultrasonic camera 163 can identify the source of the reflection change. In other words, the ultrasonic camera can use ultrasonic wavelength to identify a static or moving object.

In another embodiment, instead of one or more devices capable of capturing an image, the system may include a sensor that detects the presence of an obstacle. The sensor may detect the size, location, and/or distance of the obstacle. In some instances, a camera may be used to detect the presence of the obstacle even though an image is not captured during the process.

In some configurations, the analytics server 110 may utilize motion sensors/detectors. A motion detector is a device that detects moving objects. The motion may contain an optical, microwave, or acoustic sensor that can detect a mission or reflection of an object. For instance, changes in the optical, microwave, or acoustic field and the devices proximity are interpreted by passive infrared, microwave, ultrasonic, tomographic motion detector, video camera software, and/or digestion detectors.

The electronic notification device 150 may be any computing device used to receive beacon UUID signals, transmit the UUID signals to the analytics server 110, receive instructions from the analytics server 110, and/or present warning notifications to the user. For example, as described below, the electronic notification device 150 may be any wearable navigation device including a wristband, a bracelet, ring, and the like. In some configurations, the electronic notification device may be a mobile device (e.g., a cellular phone) or a smart watch, as shown in FIG. 1. In some configurations, the circuitry configured to achieve the above-mentioned functionalities associated with the electronic notification device 150 may be included in one or more articles of clothing. For instance, a hat, as the hat shown in FIG. 1, or a belt (or other articles of clothing) may include a receiver to receive the UUID signals, a transmitter to transmit location information of the user to the analytics server 110, and/or a notification module to notify the user (e.g., haptic notification or a speaker to present auditory notifications to the user). As described below, the analytics server may communicate with more than one electronic navigation device 150 where each device is configured for a specific functionality. For example one electronic notification device 150 may be a mobile device configured to receive and transmit UUIDs of various beacons; another electronic notification device 150 may be a wearable device with a proximity sensor configured to collect and transmit obstacle data, and a third electronic notification device 150 may be a wearable navigation device, such as a hat, configured to transmit the warning notifications to the user.

In some configurations, the user may utilize more than one electronic notification devices. For instance, the user may utilize a cellular phone to transmit location information to the analytics server 110. Additionally, the analytics server 110 may instruct another electronic notification device to present the notifications to the user. Therefore, even though electronic notification device 150 is shown as a single electronic device, in other configurations, multiple electronic devices and/or wearable navigation devices can be used. Furthermore, as described above, the analytics server 110 may also use other capabilities of the user's mobile device. For example, the analytics server 110 may activate a GPS tracking module of the user's mobile device in order to monitor the user's location.

As described above, electronic notification device 150 may also include one or more additional sensors and may transmit movement data to the analytics server 110. The electronic notification device 150 may include one or more proximity sensors to track the user's movements and identify whether the user is within a predetermined proximity to a hazardous area and/or an obstacle. In some configurations, electronic notification device 150 may include an accelerometer to measure acceleration of the user's movements. An accelerometer measures proper acceleration, which is the acceleration and experiences relative to freefall and is acceleration felt by people and objects. The accelerometer embedded or otherwise associated with the electronic notification device 150 may measure the user's single or multi-axis movement acceleration.

In some configurations, the electronic notification device 150 may also include a gyroscope sensor to measure the user's movement orientation and or angular velocity. Using the information received from the gyroscope sensor, the analytics server 110 may determine a direction that the user is facing or whether the user has fallen. In some configurations, the electronic notification device 150 may also include a compass sensor to receive additional information regarding the direction of movement of the user. In another configuration, the electronic notification device 150 may include an altimeter sensor to measure an altitude/elevation associated with the user. The analytics server 110 may use the data received from the altimeter sensor to further identify the user's movement, such as climbing the stairs.

The external data source 130 may represent any data received from an external data source including the World Wide Web or other databases. In an embodiment, the external data source 130 may represent GPS data received from a navigation resource. For instance, the user's electronic notification device 150 or the user's mobile device may be GPS-capable through a third-party application executing on the electronic notification device 150 or the user's mobile device. In those embodiments, the analytics server 110 may retrieve GPS specific data, e.g., the user's GPS location from a third party (e.g., external data source 130).

Figure 2A:
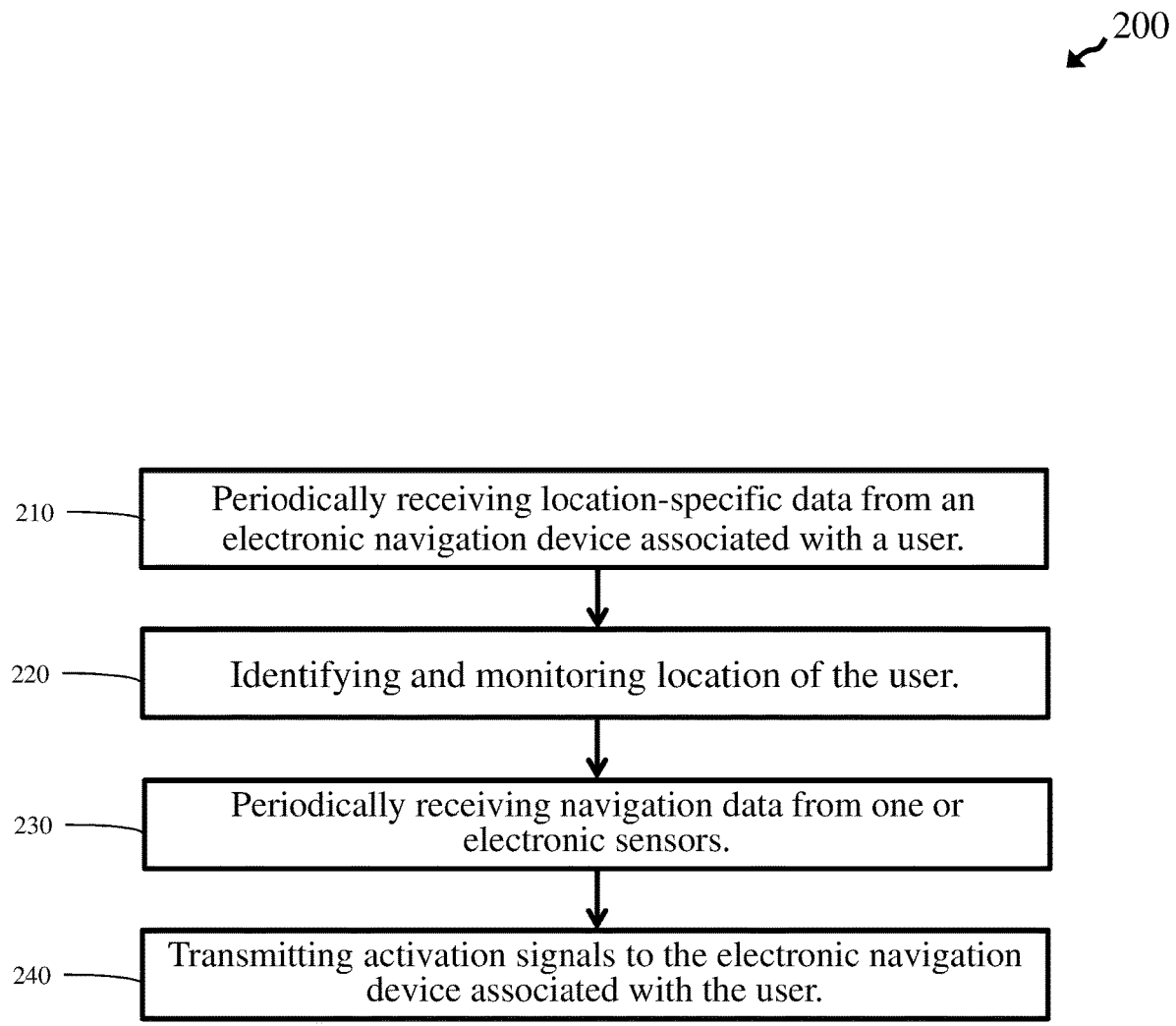
FIG. 2A illustrates a flowchart depicting operational steps of a method for providing a navigation system having an electronic wearable navigation device, according to an embodiment.

Referring now to FIG. 2, a flowchart depicting operational steps of a method for providing a navigation system having an electronic wearable navigation device is illustrated. Steps of the method 200 may be implemented using one or more features described FIG. 1. Method 200 does not imply any limitations with regard to the environments or embodiments that may be implemented. Modifications to the depicted environment or embodiment shown in FIG. 2 may be made.

At step 210 and 220, the analytics server may periodically receive location-specific data from an electronic navigation device operated by a user. The analytics server may also identify and monitor the user's location based on the received location data. As discussed above, electronic notification devices can be wearable devices, can be embedded within different articles of clothing, or can refer to the functionality of an application executing on a user's mobile device. In a non-limiting example, a user's electronic notification device may detect UUID from one or more beacons and an application executing on the electronic notification device (or a transmittal module of the electronic notification device in connection with the analytics server) may then transmit the UUIDs and any other associated information (e.g., RSSI information) to the analytics server. The analytics server may then retrieve, from internal or external database, the location information of one or more beacons associated with the received UUIDs. For instance, the analytics server may retrieve the location of the beacon associated with the UUID and based on the UUID, RSSI, or both may triangulate a location associated with the user mobile device. The analytics server may periodically repeat the method described above to monitor user's location.

As discussed above, the analytics server may augment data received from the electronic notification device with other movement data. For instance, upon receiving location data from the user's electronic notification devices, the analytics server may activate a GPS tracking module of the user's mobile device. The analytics server may also use GPS data received from the user's mobile device to track and monitor the user's location. Furthermore, the analytics server may also activate one or more sensors within the user's electronic notification device (e.g., gyroscope sensor, accelerometer sensor, compass sensor, and the like). In conjunction with the other location data, the analytics server may use the data received from these sensors to determine the exact location and the direction of movement of the user.

The analytics server may periodically receive location specific data (and other data described above) from the user's electronic notification device and/or external sources. For instance, the analytics server may monitor the user's location every 2, 5, 10 second, or any other predetermined or dynamic frequency of data collection. In this way, the analytics server may continuously monitor of the user's whereabouts. In some embodiments, the frequency of monitoring the user's location may be dynamically adjusted by the user or another party. For instance, the user can opt out (for a predetermined time) of being monitored and receiving navigation services from the analytics server. The user can also adjust (increase or decrease) the frequency of location monitoring using the website or the application hosted by the analytics server.

At step 230, the analytics server may periodically receive obstacle navigation data from one or more electronic sensors, as described in FIG. 1. For instance, the analytics server may receive thermographic data captured by a thermographic camera. The analytics server may also receive ultrasonic data capture and ultrasonic sensor or receive motion data captured by a motion sensor, or receive one or more images from an intelligent camera sensor, as described in FIG. 1.

In some configurations, upon identifying a location associated with the user, the analytics server may identify one or more electronic sensors associated with the location and activate the identified sensors. The analytics server may also query location data (e.g., floor map, arrangement data) associated with a location of the beacons and the electronic sensors. Location data, as used herein, may refer to geofencing, floor map data, and arrangement of furniture's or other objects associated with the identified location of the user. For example, as described in FIG. 3, location data of a user's dwelling may refer to a floor plan of the user's dwelling, location dimensions and arrangements of different rooms, different objects, and items. Using the location data retrieved, the analytics server may identify movement of an object inconsistent with the location data. Determination of an obstacle or hazard is further described in FIG. 3.

At step 240, the analytics server may transmit an activation signal to the user's electronic notification device or mobile device and instruct the user's electronic notification device or mobile device to present a warning notification. The analytics server may determine that the user is within a predetermined proximity of an obstacle or a hazardous area. For instance, the analytics server may determine that the user is within two, five, or any other predetermined distance from the stairways. The analytics server may also consider the user's movements, direction of movement, velocity and acceleration of movement as well. For instance, the analytics server may determine that the user is moving at a speed of 1 ft/s towards the stairways. In some embodiments, the analytics server may determine that even though the user is within the pre-determined proximity of an obstacle and or a hazardous area, the user is moving in an opposite direction, e.g., away from the obstacle or the hazardous area. If the analytics server identifies an obstacle and/or the hazardous area and determines that the user is moving towards the obstacle and/or the hazardous area, the analytics server may transmit an activation signal and instruct the user's electronic notification device or mobile device to warn the user.

The analytics server may determine the notification (e.g., intensity, duration, type) of the notification based on the user's preferences, the user's location, and/or the user's movements. For instance, the analytics server may instruct the electronic notification device to present an auditory notification via a speaker operatively associated with the electronic notification devices. In that embodiment, the analytics server may select a predetermined auditory notification based on the user's location. For instance, if the user is within 2 feet to the right of the stairways, the analytics server may generate an instruction and instruct the user's electronic notification device to play a pre-recorded audio file (e.g., "stairways on your right"). In some other embodiments, the notification may be haptic. For example when the user is within 2 feet of the stairways, the analytics server may instruct the user's electronic notification device (e.g., wristband) to produce a haptic notification (e.g., vibrate) in accordance with a predetermined intensity and frequency. In some configurations, the frequency and/or the intensity of the haptic notification may depend on the user's proximity and/or movement towards the obstacle and/or the hazardous area.

Figure 2B:
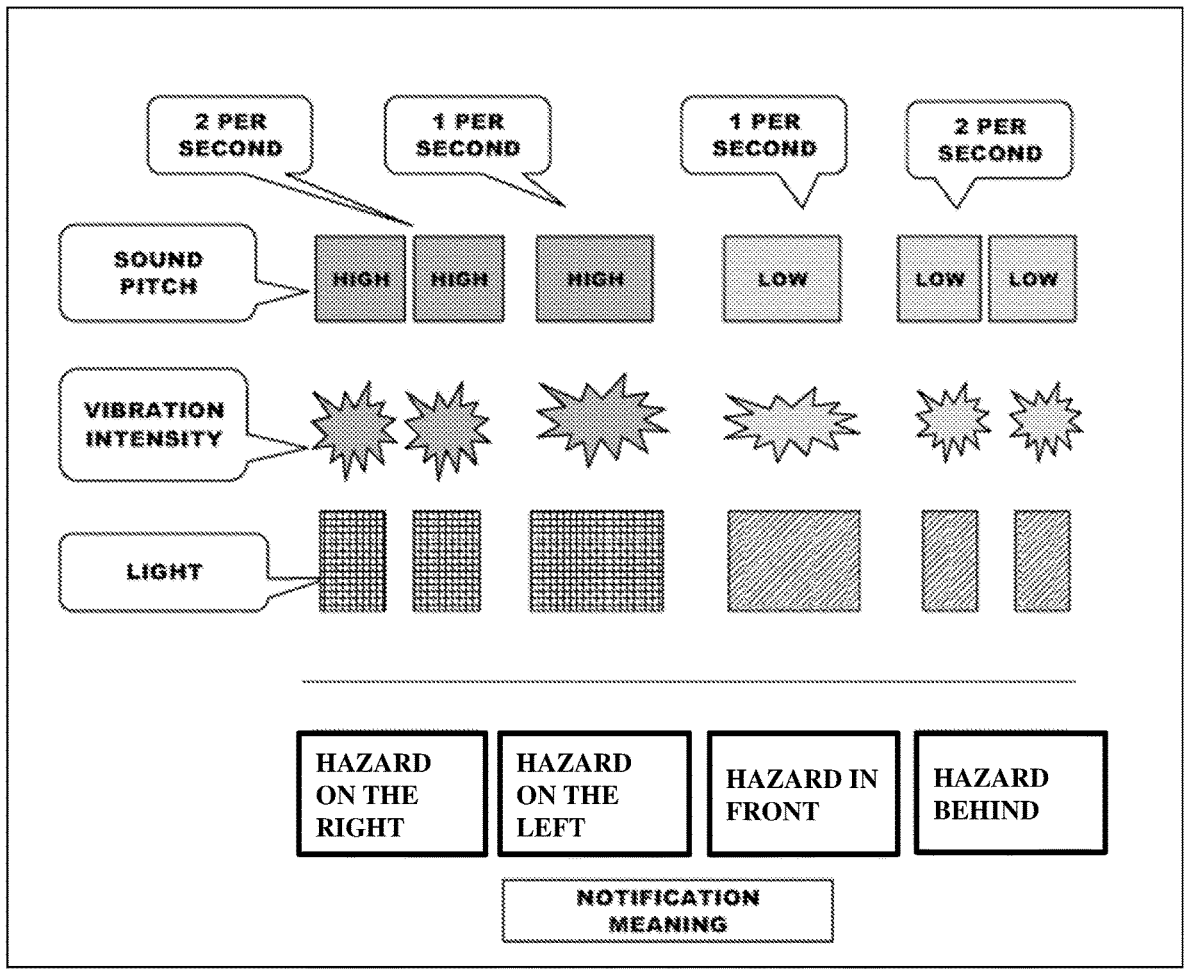
FIG. 2B illustrates a schematic diagram of different warning notifications presented by an electronic wearable navigation, according to an embodiment.
Figure 2C:
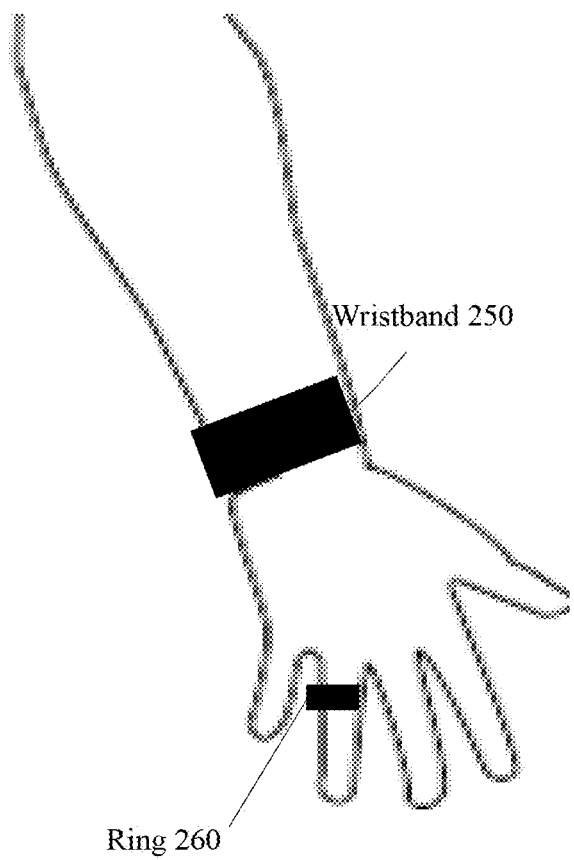
FIG. 2C illustrates an example of an electronic wearable navigation device, according to an embodiment.

Referring now to FIG. 2B, a schematic diagram of different warning notifications presented by an electronic wearable navigation is illustrated. In a non-limiting example, warning notification presets are established to create four options for notification meaning: "hazard on the right," "hazard on the left," "hazard in front," and "hazard behind." FIG. 2 represents warning notification arrangement preset by a user. The presets illustrated herein can be modified to the user's preferences. A user can access the analytics server (via an application or a website associated with the analytics server) and modify the illustrated presets. For instance, a visually impaired user may eliminate the light/color warning notifications and may modify the sound and or vibration/haptic notifications.

In FIG. 2B, the top row of alert symbols indicate the settings for audible alerts; the middle row indicates settings for haptic alerts; and the bottom row indicates settings for light alerts. Visual alerts may include different colors for different notification meaning. For instance, red light may indicate a hazardous area to the user's right and green lights may indicate a hazardous area in front of the user. Similarly, the vibration intensity and/or frequency may indicate a specific meaning. For instance, one haptic contact (e.g., tap) may indicate a hazard to the right of the user and to have the contacts may indicate hazard to the left of the user. As part of the settings, the user may set preferences for the length of time for each alert/notification type to last. For example, an audible alert can be set to last 2 seconds, vibration alert to last 1 second, and visual alert to last 5 seconds. The warning notifications presented by the electronic notification device depend upon which of the four options for notification meaning applies to the user's location:

For a hazardous area and/or obstacles to the user's right, the following warning notifications may be presented:
    Audible: Rapid Interval Low Pitch Sound (2 beeps per second)
    Vibration: Rapid and Low Intensity Vibration (2 per second)
    Visual: Rapid Green Blinking Light (2 per second)

For hazardous area and/or obstacles to the user's left, the following warning notifications may be presented:
    Audible: Low Pitch Sound (1 beep per second)
    Vibration: Low Intensity Vibration (1 per second)
    Visual: Green Quick Blinking Light (1 per second)

For hazardous area and/or obstacles in front of the user, the following warning notifications may be presented:
    Audible: High Pitch Sound (1 per second)
    Vibration: High Intensity Vibration (1 per second)
    Visual: Red Blinking Light (1 per second)

For hazardous area and/or obstacles behind the user, the following warning notifications may be presented:
    Audible: Rapid Interval High Pitch Sound (2 per second)
    Vibration: Rapid High Intensity Vibration (2 per second)
    Visual: Rapid Red Blinking Light (2 per second)

Referring back to FIG. 2A, the analytics server may instruct one or more electronic notification devices to present the above-mentioned warning notifications. As described above, and as depicted in FIG. 2C, the user may have more than one electronic notification devices. For instance, the user may have a wristband electronic notification device 250 on his left wrist and a ring electronic notification device 260. In those embodiments, the analytics server may modify the notification accordingly. For instance if the user is within the predetermined proximity to the left of an obstacle, the analytics server may instruct the right wristband (or the left or whichever electronic notification device the user prefers) to present the warning notification. The warning notifications may be completely modified and adjusted based on the user's preferences. For instance, the user can instruct analytics server to produce warning notifications regarding any hazardous area or obstacles in front of the user only to his ring electronic notification device 260. Other similar modifications may be achieved based on user preferences, impairments, and/or disabilities.

In some configurations, electronic sensors (described as electronic sensors 160 in FIG. 1) can all be associated with the user's electronic notification devices. For instance, in addition to having (or otherwise being associated with) the above-mentioned electronic sensors, the user's electronic notification device may also include the electronic sensors/cameras described above. For instance, the user's electronic notification device may include one or more of the ultrasonic camera, the motion detector, and the infrared thermographic camera. When utilized by the user, these sensors, in conjunction with the other senses described above (accelerometer, alternator, gyroscope, and the other sensors described above) the user's electronic notification device maybe use to warn the user obstacles and or hazardous areas around the user. In some configurations, the user may utilize more than one electronic notification device where each electronic notification device includes one or more of the sensors described above. For instance, the user's belt may include an accelerometer, the user's hat may include thermographic camera, and the users ring may include circuitry to present warning notifications (e.g., haptic notification).

In some embodiments, the analytics server may store location data, notification data and preferences, and user's responses to the vacation in a database or a cloud-based storage system. The analytics server may continuously or periodically update such as storage. The stored data may then be analyzed in order to provide more accurate navigation services to the user. For example, when the user is warned (more than a predetermined number of times) regarding a hazardous area but continues moving towards the hazardous area, the analytics server may determine that the user does not consider said area hazardous. As a result, the analytics server may modify its notifications accordingly. For example, the analytics server may no longer warn the user when the user is located within a predetermined proximity to said location.

Figure 3A:
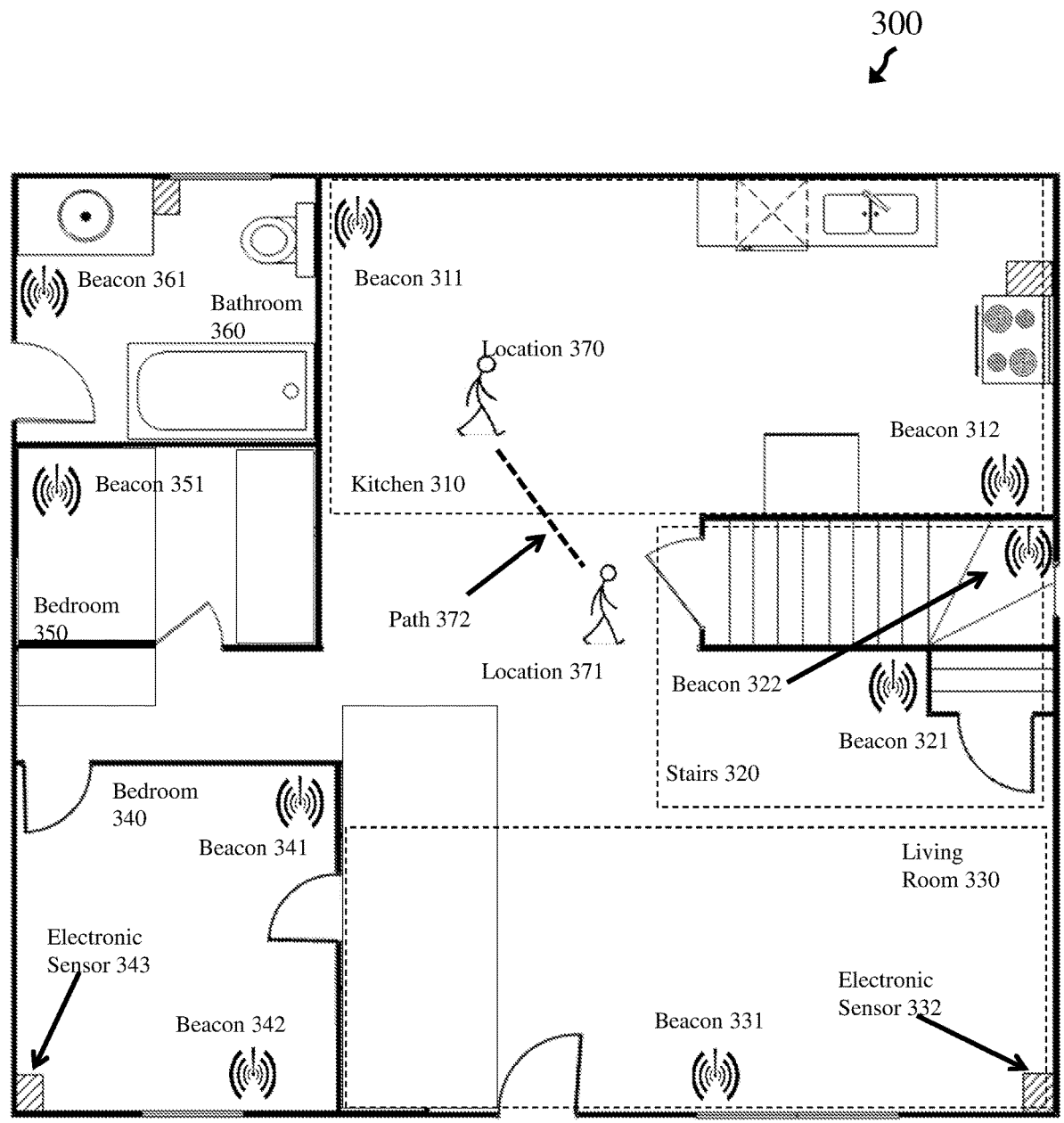
FIG. 3A illustrates an example of an indoor navigation method using a navigation system having one or more electronic wearable navigation devices, according to an embodiment.

Referring now to FIG. 3A an example of an indoor navigation method using a navigation system having one or more electronic wearable navigation devices is illustrated. In the depicted embodiment, a user receives navigation services provided by the analytics server within dwelling 300. In this embodiment, the user has previously provided a floor map of the dwelling 300, which indicates different areas, items, hazardous areas within the dwelling 300. For instance, the floor map depicted in FIG. 3 indicates the location of the kitchen 310, the stairs 320, the living room 330, bedroom 340, bedroom 350, and about 360. As depicted, the dwelling 300 includes several beacons located in different areas. For instance, kitchen 310 includes beacon 311 and beacon 312; the stairs 320 includes beacon 322 and beacon 321; the living room 330 includes the beacon 331; bedroom 340 includes beacon 341 and 342; the bedroom 350 includes beacon 351; and bathroom 360 includes beacon 361. Using the above-mentioned beacons, the analytics server can geo-fence various areas within the dwelling 300. For example using beacons 312 and 311, the analytics server may geo-fence kitchen 310 as depicted by the dashed lines. In the same manner, the analytics server may geo-fence stairs 320, living room 330, bedrooms 340 and 350, and bathroom 360, as depicted in dashed lines. As a result, when a user is within any of the depicted geo-fenced areas, the analytics server may triangulate and identify an exact location associated with the user.

When an electronic notification device of a user located at the location 370 receives the UUID of the beacons 312 and 311, the electronic notification device transmits the UUIDs to the analytics server. The analytics server may then retrieve location associated with the UUIDs received. Based on the UUIDs, the analytics server identifies that the user is located within geo-fence kitchen 310. The analytics server may also retrieve any location data (e.g., floor map, furniture arrangement, a list of items, a list of hazardous areas and the like) associated with the UUIDs of the beacon. For instance, when the analytics server receives UUID of beacon 312, the analytics server may retrieve the floorplan as depicted in FIG. 3, which illustrates different geo-fenced areas, a list and location of each item within the dwelling 300, and other location data described above.

The analytics server may then continuously monitor the user's whereabouts. For instance, when the user moves to the location 371, the analytics server can determine that the user has left the geo-fence kitchen 310 because the RSSI of beacons 311 and 312 decrease and the electronic notification device of the user is now receiving and transmitting UUIDs from beacons 321 and 322. Therefore, the analytics server can determine that the user is moving along the path 372. Because the location 371 is within a predetermined proximity (e.g., 2 feet) of the stairs 320, which has previously been designated as a hazardous area, the analytics server generates and transmits a signal to at least one of the user's electronic notification devices to present a warning notification consistent with a hazardous area in front of the user. The warning notification, as described above, can be an auditory notification. For instance, the users in the may play a prerecorded voice indicating that the user is near the stairs.

In a non-limiting example, when the analytics server determines that the user is within the dwelling 300, e.g., when the UUID received from the user's mobile device or a wearable navigation device matches a UUID of the dwelling 300, the analytic server may retrieve a floor map of the dwelling 300, where the floor map identifies hazardous areas (e.g., stairs 320) and their corresponding beacons (e.g., beacon 321 and 322). The analytics server may then monitor the location of the user throughout the dwelling 300 and notify the user when the user is location within a predetermined proximity to a hazardous area.

Figure 3B:
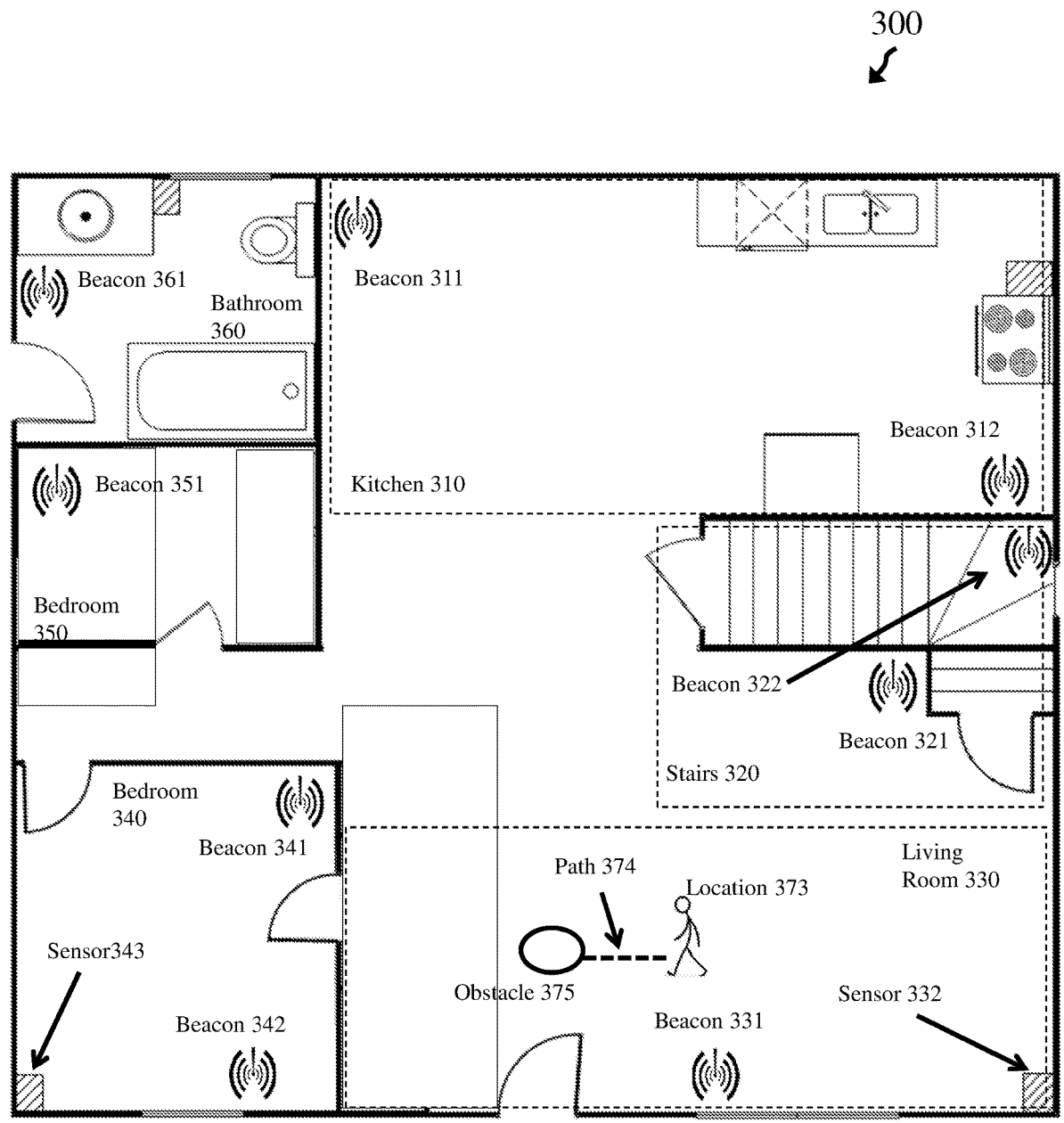
FIG. 3B illustrates an example of an indoor navigation method using a navigation system having one or more electronic wearable navigation devices, according to an embodiment.

Referring now to FIG. 3B an example of an indoor navigation method using a navigation system having one or more electronic wearable navigation devices is illustrated. In the depicted embodiment, similar to FIG. 3, a user receives navigation services provided by the analytics server within the dwelling 300. As described above, dwelling 300 includes several beacons. As depicted in FIG. 3B, the dwelling 300 also includes one or more electronic sensors. For example, the geo-fenced area in the living room 330 includes an electronic sensor 332. Additionally, the bedroom 340 includes an electronic sensor 343. As described above, each electronic sensor may represent an intelligent camera, an ultrasonic sensor camera, infrared thermographic camera, and/or a motion sensor. In the spirit of brevity, FIG. 3B does not show a separate sensor or camera for each electronic sensor described above. For example, the electronic sensor 332 may represent any of the above-mentioned electronic sensors. One skilled in the art will recognize that in different configurations different combinations of one or more electronic sensors and cameras may be used.

As described above, the analytics server may continuously receive obstacle navigation data from electronic sensors 332 and 343. As a result, the analytics server may continuously monitor for obstacles, hazardous conditions, and/or moving objects within the dwelling 300. For instance, the electronic sensor 332 may determine that the obstacle 375 is located within the living room 330. In some configurations, the analytics server may retrieve location data associated with the dwelling 300. If the location data does not include the identified obstacle 375, the analytics server may designate the obstacle 375 as a hazardous area. Therefore, when the user is within the predetermined proximity to the obstacle 375, the analytics server may generate the warning notification for the user.

In some embodiments, the analytics server may only receive (e.g., instruct to transmit) obstacle/navigation data from electronic sensors within a predetermined proximity to the user. For instance, if the user is located at location 373, the analytics server may only consider data received from electronic sensor 332, and not sensor 343. In some configurations, the analytics server may reduce the frequency of data capture for other sensors accordingly. For instance, when the user is located within the living room 330, the analytics server may reduce the frequency of data capture for sensor 343 in order to increase efficiency and reduce the volume of data transmittal.

In the depicted embodiment, the user's electronic notification device receives UUID from beacon 331. Upon receiving the UUID and RSSI, the analytics server determines a location of the user to be the location 373. By continuously monitoring the user's location and other movement data received from the user's electronic notification devices, the analytics server determines that the user is moving along the path 374 and towards the obstacle 375. For instance, the analytics server may determine the velocity and acceleration of the user's movement along the path 374 via the data received from an accelerometer associated with at least one of the user's electronic notification devices. The analytics server may also determine that the user is moving towards, and not the way from, the obstacle 375 because of the monitored location of the user and data received from the users compass and gyroscope associated with his electronic notification devices. As a result, the analytics server determines that the user is within a predetermined proximity of, and moving towards, the obstacle 375. Therefore, the analytics server instructs one or more user's electronic notification devices to present a proper warning notification to the user.

Figure 4:
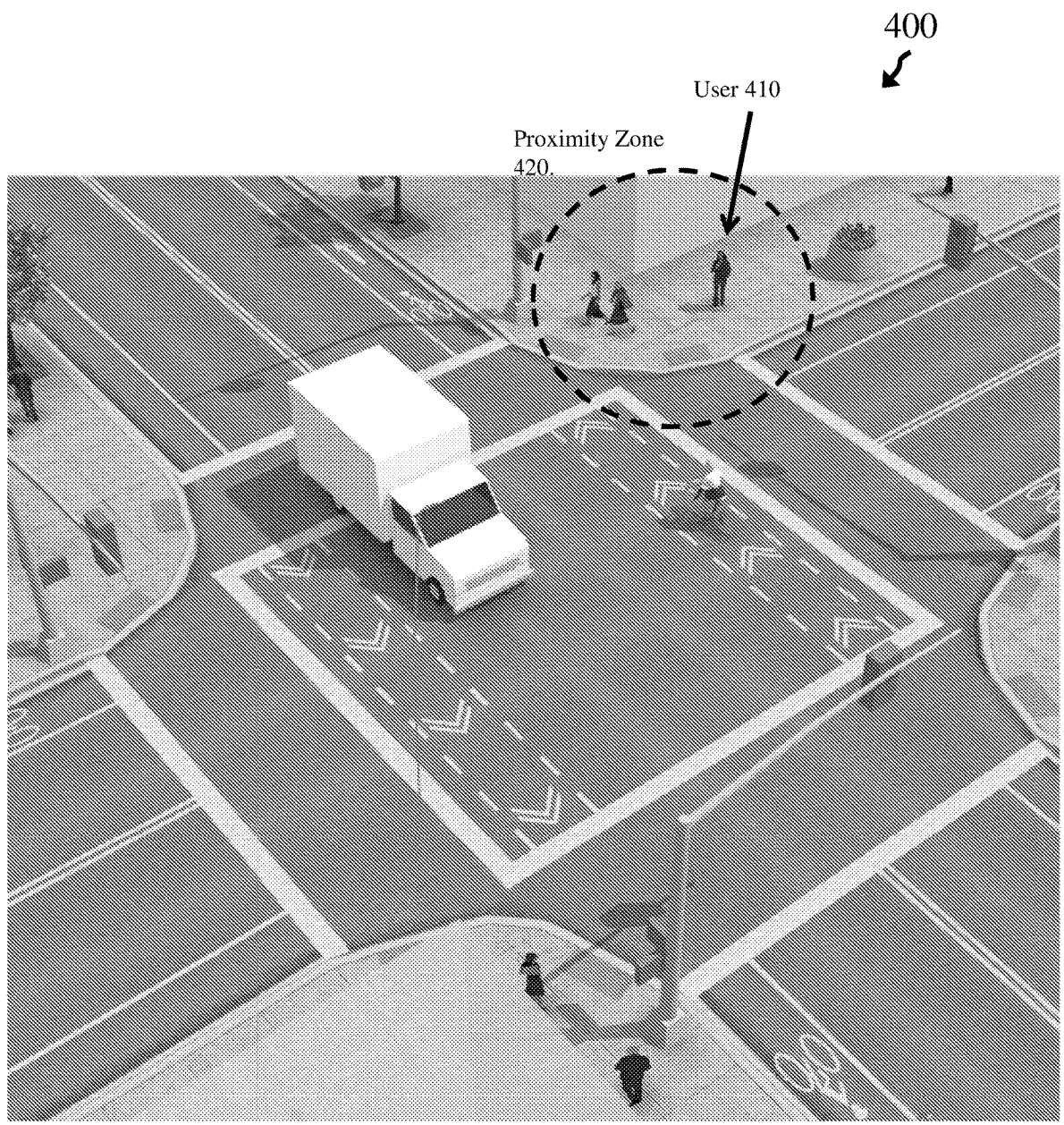
FIG. 4 illustrates an example of an outdoor navigation method using a navigation system having an electronic wearable device, according to an embodiment.

FIG. 4 illustrates using a navigation system having an electronic wearable device, according to an embodiment. As described above, the analytics server offers indoor and outdoor navigation support for users. FIG. 4 depicts an embodiment where the analytics server provides warning notification to a user in an outdoor setting. When the analytics server receives a request for outdoor navigation from a user, the analytics server transmits an instruction to the user's electronic notification device to activate a GPS tracking device embedded or otherwise associated with the user's electronic notification devices. For instance, the analytics server may activate a GPS tracking module the user's mobile device. In some configurations, the analytics server may use an API installed and executing on the user's electronic notification device to retrieve location data. Additionally or alternatively, the analytics server may directly contact third-party server and periodically receive location data associated with the user's mobile device (e.g., external data source 130 in FIG. 1).

Using the methods described above, the analytics server may augment the data received from the external data source (e.g., GPS tracking data) with movement data received from the user's electronic notification devices' movement sensors. For example, in addition to receiving GPS tracking data, the analytics server may also receive the user's movement data using the accelerometer, the velocity sensor, or other sensors associated with at least one of the user's electronic notification devices.

When analytics server determines that a user is within a predetermined proximity to a hazardous area, the analytics server may instruct at least one of the user's electronic notification devices' to present a warning notification, as described above. The analytics server may continuously monitor location information associated with user 410 using a third party GPS tracking application installed on the user 410's mobile device. When the user 410 is within a predetermined distance from an intersection (proximity zone 420), the analytics server may transmit a warning notification to the user for 410's electronic notification device (e.g., an application executing on the user 410's mobile device) or one or more of the user 410's electronic notification devices.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise Random Access Memory (RAM), Read Only Memory (ROM), Electrically Erasable Programmable Read-Only Memory (EEPROM), CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product. Additionally, the operations of the methods and system disclosed herein may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
upon determining, by a server, an obstacle within a predetermined proximity to a location of a wearable device:
generating, by the server, an instruction to present a warning notification corresponding to a distance between the location of the wearable device and the obstacle; and
transmitting, by the server, the instruction to the wearable device, whereby upon receiving the instruction, the wearable device presents the warning notification, wherein the server determines a location of the obstacle based on a map associated with the location of the wearable device.

2. The method of claim 1, wherein the location of the wearable device is monitored via one or more beacons.

3. The method of claim 1, wherein location information of the wearable device is received from a third-party location tracking application executing on the wearable device.

4. The method of claim 1, wherein the server further determines the location of the obstacle using at least one of an infrared thermal imaging camera, a sonar camera, an ambient light sensor, or a proximity sensor.

5. The method of claim 1, wherein the wearable device is a wristband or a ring.

6. The method of claim 1, wherein the warning notification further corresponds to a direction of movement associated with the wearable device.

7. The method of claim 1, wherein the warning notification comprises at least one of a haptic notification, a visual notification, or an auditory notification.

8. The method of claim 1, wherein the wearable device is incorporated into an item of clothing.

9. The method of claim 1, wherein the server determines that the obstacle is within the predetermined proximity to the wearable device based on a speed of movement associated with the wearable device.

10. A system comprising:
a server comprising a processor and a non-transitory computer-readable medium containing instructions that when executed by the processor causes the processor to perform operations comprising:
upon determining an obstacle within a predetermined proximity to a wearable device:
generating an instruction to present a warning notification corresponding to a distance of a location of the wearable device and the obstacle; and
transmitting the instruction to the wearable device, whereby upon receiving the instruction, the wearable device presents the warning notification, wherein the server determines a location of the obstacle based on a map associated with the location of the wearable device.

11. The system of claim 10, wherein the location of the wearable device is monitored via one or more beacons.

12. The system of claim 10, wherein location information of the wearable device is received from a third-party location tracking application executing on the wearable device.

13. The system of claim 10, wherein the server further determines the location of the obstacle using at least one of an infrared thermal imaging camera, a sonar camera, an ambient light sensor, or a proximity sensor.

14. The system of claim 10, wherein the wearable device is a wristband or a ring.

15. The system of claim 10, wherein the warning notification further corresponds to a direction of movement associated with the wearable device.

16. The system of claim 10, wherein the warning notification comprises at least one of a haptic notification, a visual notification, or an auditory notification.

17. The system of claim 10, wherein the server determines that the obstacle is within the predetermined proximity to the wearable device based on a speed of movement associated with the wearable device.

18. A wearable device having a processor configured to:
receive an instruction to present a warning notification corresponding to a distance of a location of the wearable device and an obstacle, wherein a server generates the instruction upon determining that the obstacle is located within a predetermined proximity to the wearable device, wherein the server determines a location of the obstacle based on a map associated with the location of the wearable device; and
present the warning notification.

* * * * *